May 3, 1966  W. D. SINCLAIR ETAL  3,249,817
LIQUID-COOLED ELECTRIC TRANSFORMERS
Filed March 4, 1963  3 Sheets-Sheet 1

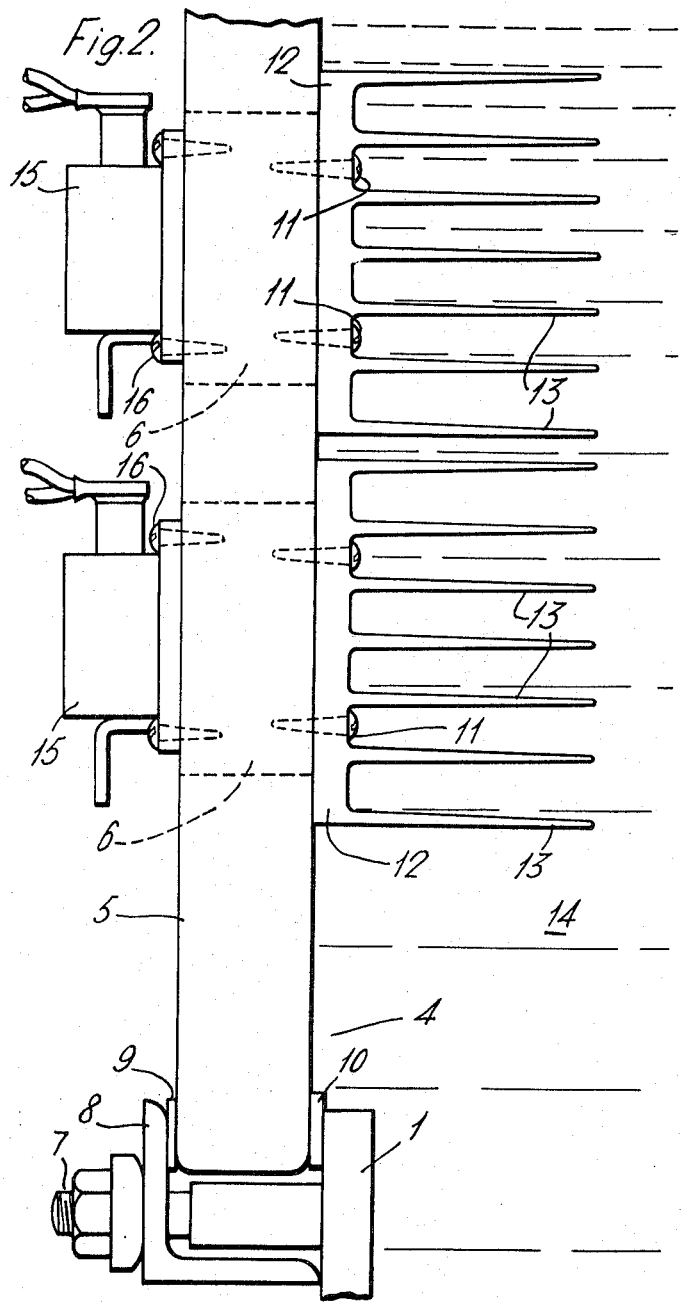

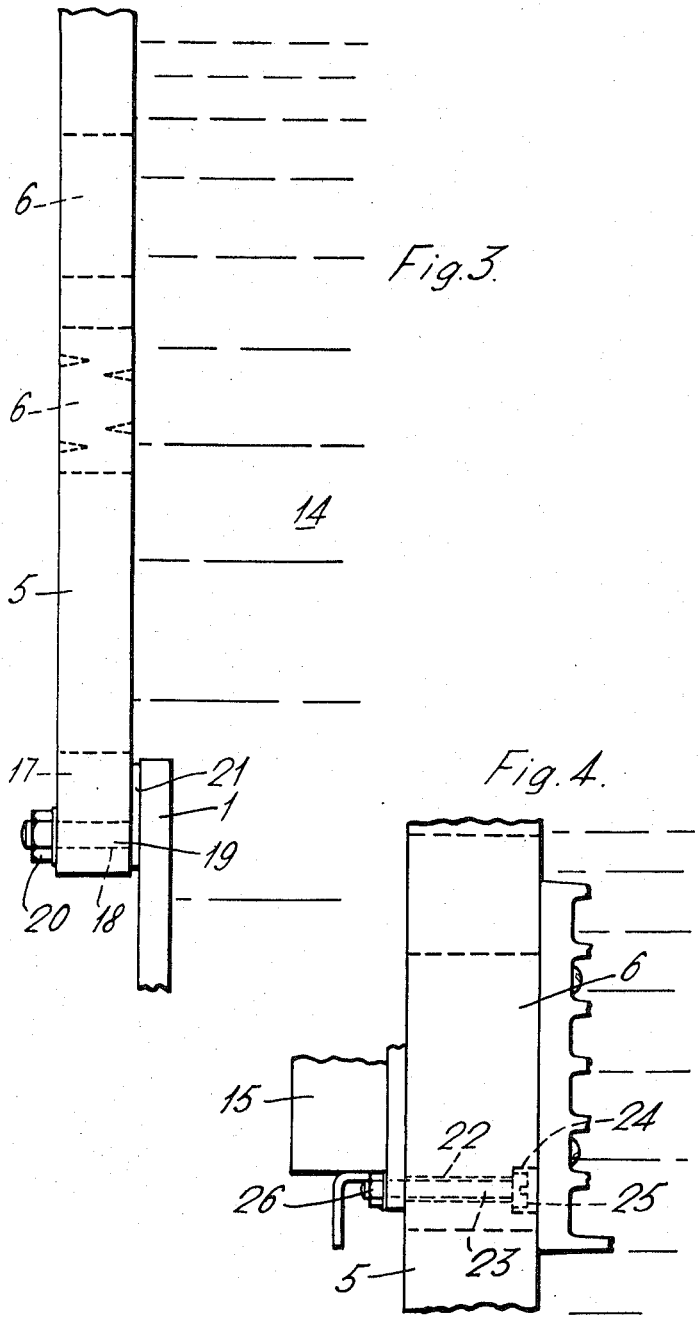

United States Patent Office 3,249,817
Patented May 3, 1966

3,249,817
LIQUID-COOLED ELECTRIC TRANSFORMERS
William Donald Sinclair and Gordon Ambrose Carrick, Rugby, England, assignors to Associated Electrical Industries Limited, London, England, a company of Great Britain
Filed Mar. 4, 1963, Ser. No. 262,691
Claims priority, application Great Britain, July 6, 1962, 26,054/62
13 Claims. (Cl. 317—100)

This invention relates to electric transformers of the liquid-cooled type and relates more specifically to combined transformer-rectifier equipment.

In the case of sub-stations for direct current railway systems, for example, it is usual for sub-station equipment, which may comprise electric transformers of the oil-cooled type and associated semi-conductor rectifiers, switches and control gear, to be accommodated within relatively expensive track-side buildings. Economies in building space may be achieved and expenditure can thus be reduced by providing a combined transformer-rectifier equipment which is suitably weatherproofed for external operation so that sub-station buildings need only house the switches and control gear.

The combined transformer-rectifier equipment may have the semi-conductor rectifier cells and associated heat sinks arranged within the transformer coolant tank so that they are immersed in the transformer coolant. Such an equipment, however, suffers from the disadvantage that the transformer tank needs to be dismantled or at least opened in order to gain access to the semi-conductor rectifier cells and this can present serious problems when maintaining outside installations under adverse weather conditions.

The present invention has in view a combined transformer-rectifier equipment which is eminently, but not exclusively, applicable to railway sub-station installations as aforesaid for the purpose of affording economies in building space and cost and which provides for the cooling of the semi-conductor rectifier cells by the transformer coolant yet allows the rectifier cells to be accessible without the necessity of opening the transformer tank.

According to the present invention there is provided a combined liquid-cooled transformer-rectifier equipment, in which an opening in the coolant tank of the transformer is closed by a plate of electrically insulating material embodying one or more metal heat sinks contacted by the transformer coolant on the inward side of the plate and the, or each, heat sink having a semi-conductor rectifier cell detachably secured to it on the outward side of the plate and transformer tank.

Where the plate embodies a number of heat sinks, the semi-conductor rectifier cells secured to the respective heat sinks will have corresponding poles thereof insulated from one another by the insulating material of the plate so that the rectifier cells can readily be connected in series. This feature is especially advantageous in high voltage applications where it may be desirable to share the voltage between two or more semi-conductor rectifier cells connected in series.

The, or each, heat sink embodied in the insulating plate may comprise a metal insert (e.g., of generally cylindrical form) which extends through the plate from one side to the other. This insert will be sealed through the plate in oil-tight manner and cooling fins are preferably provided on the inward face of the, or each, heat sink, such as by securing a finned structure to the inward face of the heat sink by screws or by making the fins integral with the insert. To the outer face of each metal insert, a semi-conductor rectifier cell will be attached preferably by screws screwing into blind holes provided in the metal inserts. By employing such securing means or by arranging that any through passageways which extend through the plate of insulating material will remain blocked when a semi-conductor rectifier cell is removed from its heat sink, draining of the transformer coolant or loss of such coolant is avoided.

The metal insert or inserts, as the case may be, are preferably introduced into the plate of insulating material during moulding of the latter, but in an alternative construction the heat sinks may have a cylindrical part received, for example threadingly, by holes extending through the insulating plate. The heat sink or sinks are sealed in oil-tight manner with the plate. Such sealing may be effected by bonding the heat sink or sinks, as the case may be, to the plate by a suitable bonding material. Alternatively, oil-tight sealing may be achieved by means of an "O" ring of suitable deformable material clamped between the heat sink and the inward surface of the plate where the heat sink is screwed into a hole in the plate.

Since the plate for mounting the semi-conductor rectifier cell or cells on the transformer tank wall is of insulating material, the necessity of ensuring that the plate is insulated from the transformer tank wall is avoided and this has distinct advantages since it enables an especially advantageous plate clamping arrangement to be employed, as will hereinafter be apparent, where insulating the plate from the tank would present considerable difficulties.

The use of a plate of insulating material embodying a plurality of heat sinks to which semi-conductor rectifier cells are secured has significant advantages over an arrangement in which semi-conductor rectifier cells have to be insulated individually from the tank wall to enable the semi-conductor rectifier cells to be connected electrically in series.

Cooling fins of the heat sink or sinks preferably extend in directions parallel to the direction of flow of the transformer coolant within the coolant tank.

Some of the electrical connections between the semi-conductor rectifier cells and transformer windings can be made entirely within the coolant tank since the heat sinks with which poles of the semi-conductor rectifier cells will be in electrical contact are themselves accessible within the transformer coolant tank. Electrical connections to the other poles of the rectifier cells may be effected through the coolant tank by conductors passing through suitable studs in the transformer tank wall.

The present invention as broadly conceived also provides a combined liquid-cooled transformer-rectifier equipment, in which the transformer coolant tank has insulatingly mounted on its internal surface, so as to be contacted by the transformer coolant, one or more heat sinks each engaged by a semi-conductor rectifier cell positioned in good heat-exchange relationship with the heat sink and readily accessible from the outside of the transformer tank.

By way of example the present invention will now be described with reference to the accompanying drawings, in which:

FIG. 2 is a diagrammatic view of a semi-conductor rectifier mounting plate clamped to the transformer tank side wall;

FIG. 3 is a diagrammatic view of an alternative construction of semi-conductor rectifier mounting plate clamped to the transformer tank side wall;

FIG. 4 illustrates alternative means for securing semi-conductor rectifier cells to heat sinks embodied in the rectifier mounting plate; and, FIG. 5 illustrates yet another alternative means for securing rectifier cells to heat sinks.

Figure 1:
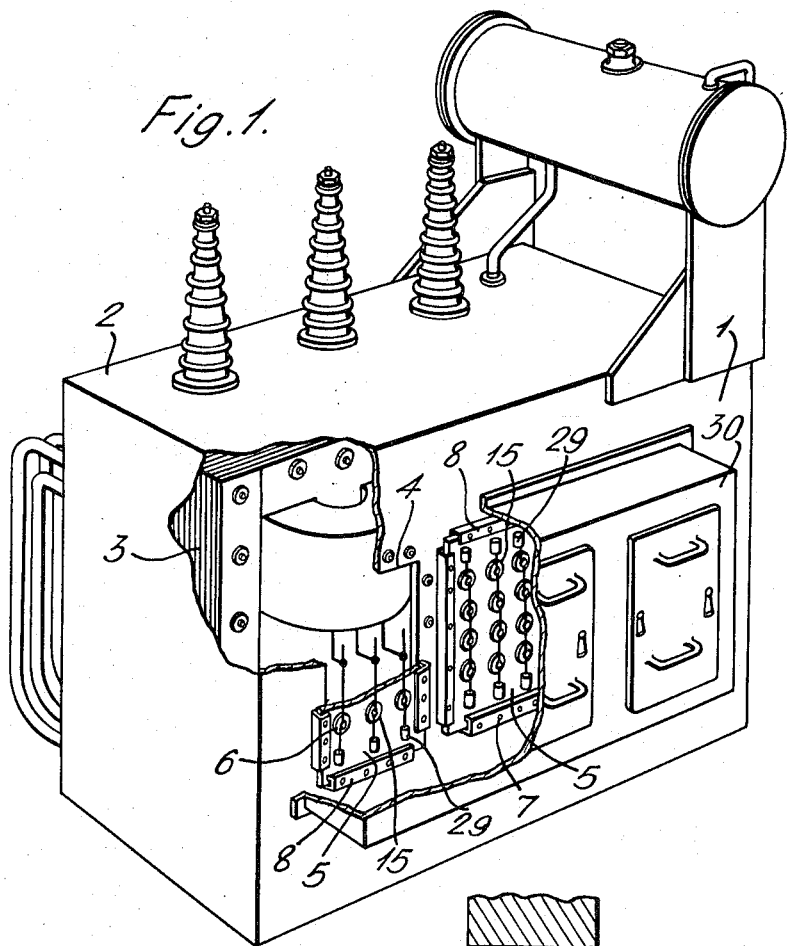
FIG. 1 is a diagrammatic cut away view of a combined oil-cooled transformer-rectifier equipment according to the invention.

Referring to FIGS. 1 and 2 of the drawings, the side wall 1 of a transformer oil tank 2 housing a transformer shown partly at 3 has an opening 4 which is closed by means of a semi-conductor rectifier mounting plate 5 clamped to the tank wall. This rectifier mounting plate 5 is made from electrical insulating material (e.g., synthetic resin) and is provided with a number of relatively small metal inserts 6 of cylindrical form, composed of aluminium for example. As can be seen from FIG. 2, these metal inserts 6 extend through the plate 5 from one side of the latter to the other and, if required, these inserts may be bonded to the plate. The peripheral regions of the plate 5 are wholly of insulating material in the present embodiment and the plate is clamped to the transformer tank wall 1 by means of nuts and bolts 7 exerting clamping pressure through metal angle members 8 on the peripheral regions of the plate 5. A gasket 9, such as of lead, is interposed between the angle member 8 and the plate 5. The angle member 8 acting through the gasket 9 serves to distribute the clamping pressure continuously along the peripheral regions of the plate 5 which will be attached to the tank wall 1 by the plate clamping bolts. To effect oil-tight sealing between the plate 5 and the transformer tank wall 1 adjacent the wall opening 4, a gasket 10 of any suitable material (e.g., oil resisting rubber) is introduced between the plate and the tank wall.

The inward faces of the metal inserts 6 have secured to them by securing screws 11 or have made integral with them metal finned structures 12 providing cooling fins 13 which are immersed in the transformer oil 14. The metal inserts 6 and their associated finned structures, together constitute heat sinks for semi-conductor rectifier cells. Each of the metal inserts 6 accordingly has a semi-conductor rectifier cell 15 secured to the outward face of the insert by screws 16 threading into blind holes provided in the appertaining metal insert. The semi-conductor rectifier cells 15 have corresponding poles thereof electrically connected to the respective metal inserts 6, but these poles are insulated from one another by the insulating material of the plate 5. Accordingly, the rectifier cells 15 can readily be connected in series relationship by appropriate interconnections. In addition, the semi-conductor rectifier cells 15 can be removed from the rectifier mounting plate 5 without the necessity of opening the tank 2 or without suffering any loss of transformer oil or having to drain oil from the tank 2 prior to the removal of the rectifier cells.

Turning now to FIG. 3 of the drawings, this shows a fragment of an alternative construction of the rectifier mounting plate 5, in which the mounting plate is formed conveniently during a moulding process with a metal peripheral portion 17 apertured at 18 for the passage of threaded studs or bolts 19 which receive nuts 20 for clamping the plate to the tank wall 1. An oil seal gasket 21 is interposed between the outer metallic portion 17 and the tank wall 1.

FIG. 4 depicts an alternative manner of securing the semi-conductor rectifier cells 15 to the outward faces of the metal inserts 6. In this connection, each of the metal inserts is provided with a plurality of through holes, such as the through hole shown at 22. The tank of a bolt 23 is passed through the hole 22 so that the head of the bolt is accommodated within an enlarged portion 24 of the through hole 22. Bonding material is then introduced into the hole 22 so as to fill the enlarged portion of the hole 22 as indicated at 25 in order to bond the bolt to the metal insert and also provide oil-tight sealing. The bolt 23 where it extends from the front of the metal insert receives a nut 26 for clamping the rectifier cell 15 to the insert 6. This arrangement for securing the semi-conductor rectifier cells 15 to the metal inserts avoids the necessity of providing tapped holes for the purpose of receiving securing screws in the metal inserts and in the present application provides the same advantages as the rectifier securing means shown in FIG. 2 of the drawings.

Figure 5:
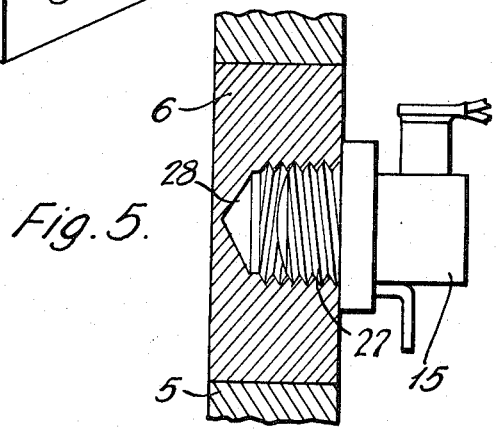

Yet another manner of securing the rectifier cells 15 to the metal inserts 6, as illustrated in FIG. 5, would be to arrange that a threaded extension 27 of each cell formed integrally with it or secured to it, such as by means including screws, is received by a threaded blind hole 28 in the insert 6.

Reverting to FIG. 1 of the drawings, the combined transformer-rectifier equipment is rendered suitable for external operation, that is to say, the equipment need not be accommodated within a building, by arranging that the semi-conductor rectifier cells 15 mounted on the side of the tank wall 1 are enclosed, together with protective fuses 29 associated with the rectifier cells, within a cover member 30 of metal for example fitted over the front of the panel 5 so as to exclude the ingress of moisture and dirt into the rectifier cell and fuse enclosure. The servicing and replacement of rectifier cells and/or fuses can thus be effected rapidly and simply by removing a plate covering an access opening in the weatherproof cover member 30 so as to expose the rectifier cells 15 and fuses 29 and under bad weather conditions temporary protection can readily be provided during servicing or replacement operations. The cover member 30 in fact serves to protect a plurality of plate rectifier cell-fuse assemblies in the present embodiment as can be seen from FIG. 1.

From the foregoing, it will be apparent that the present invention provides a combined transformer-rectifier equipment, in which the rectifier cells are cooled by means of the coolant for the transformer by arranging that the heat sinks are in heat-exchange relationship with such coolant, but at the same time the semi-conductor rectifier cells are mounted externally of the coolant tank so that they are readily accessible and removable from their mounting plate as are also the protective fuses associated with the semi-conductor rectifier cells, thereby overcoming the disadvantage of combined equipments hitherto employed, in which the rectifier cells are themselves completely immersed within the transformer coolant.

What we claim is:
1. A direct current electricity source comprising:
 (a) an electric transformer;
 (b) primary and secondary windings in said transformer;
 (c) a tank housing said transformer;
 (d) a liquid coolant contained by said tank and arranged to cool said transformer;
 (e) a wall of said tank;
 (f) an aperture in said wall;
 (g) a plate of insulating material fastened to said wall, and closing said aperture;
 (h) a heat sink embedded in said plate so that the heat sink extends completely through said plate;
 (i) an inner end of said heat sink in contact with said coolant;
 (j) an outer end of said heat sink;
 (k) a semi-conductor rectifier cell outside said tank, mounted in good thermal contact with said outer end of said heat sink and detachably secured thereto;
 (l) circuit means including said secondary winding and said rectifier cell; and
 (m) an alternating current electricity source connected to said primary winding.

2. A direct current electricity source according to claim 1, in which said heat sink comprises a metal insert.

3. A direct current electricity source according to claim 2, in which cooling fins extend from said inner end of said heat sink.

4. A direct current electricity source according to claim 3, in which said cooling fins are attached to said inner end of said heat sink.

5. A direct current electricity source according to claim 1, in which said heat sink consists of a cylindrical member which fits, in sealing relation, into a hole in said plate.

6. A direct current electricity source according to claim 5, in which said heat sink is bonded to said plate in said hole.

7. A direct current electricity source according to claim 6, in which there are screw-thread means for detachably securing said semi-conductor rectifier cell to said heat sink, and said screw-thread means engage screw-threaded blind holes in said heat sink.

8. A direct current electricity source according to claim 1, including nuts and bolts for detachably securing said semi-conductor rectifier cell to said heat sink, and each said bolt fits, in sealing relation, into a hole in said heat sink, and has a screw-threaded portion projecting outside said tank in engagement with one of said nuts.

9. A direct current electricity source according to claim 1, in which there is a gasket of deformable material around said aperture and between said plate and said wall, and clamping means for fastening said plate to said wall.

10. A direct current electricity source comprising:
 (a) an electric transformer;
 (b) primary and secondary windings in said transformer;
 (c) a tank housing said transformer;
 (d) a liquid coolant contained by said tank and arranged to cool said transformer;
 (e) a wall of said tank;
 (f) an aperture in said wall;
 (g) a plate of insulating material fastened to said wall, and closing said aperture;
 (h) a plurality of spaced apart heat sinks embedded in said plate so that each heat sink extends completely through said plate;
 (i) an inner end of each said heat sink in contact with said coolant;
 (j) an outer end of each said heat sink;
 (k) a plurality of semi-conductor rectifier cells outside said tank, each of which cells is mounted in good thermal contact with said outer end of one of said heat sinks, and detachably secured thereto;
 (l) circuit means including said secondary winding and said rectifier cells; and
 (m) an alternating current electricity source connected to said primary winding.

11. A direct current electricity source according to claim 10, in which there are cooling fins extending from each said inner end of said heat sinks, a gasket of deformable material around said aperture and between said plate and said wall, and clamping means for fastening said plate to said wall.

12. A direct current electricity source according to claim 11, including nuts and bolts for detachably securing said semi-conductor rectifier cells to said heat sinks, each said bolt fitting, in sealing relation, a hole in one of said heat sinks and having a screw-threaded portion projecting outside said tank in engagement with one of said nuts.

13. A direct current electricity source according to claim 11, including screw-thread means for detachably securing each of said semi-conductor rectifier cells to one of said heat sinks, and each of said screw-thread means engages a screw-threaded blind hole in one of said heat sinks.

References Cited by the Examiner

UNITED STATES PATENTS

| 2,815,472 | 12/1957 | Jackson | 317—100 |
| 2,825,033 | 2/1958 | Rudd | 336—58 |

FOREIGN PATENTS 1,046,199  12/1958  Germany.

KATHLEEN H. CLAFFY, *Primary Examiner.*

H. J. RICHMAN, *Assistant Examiner.*